No. 874,541. PATENTED DEC. 24, 1907.
R. B. REECE.
GATE.
APPLICATION FILED JUNE 10, 1907.
2 SHEETS—SHEET 1.
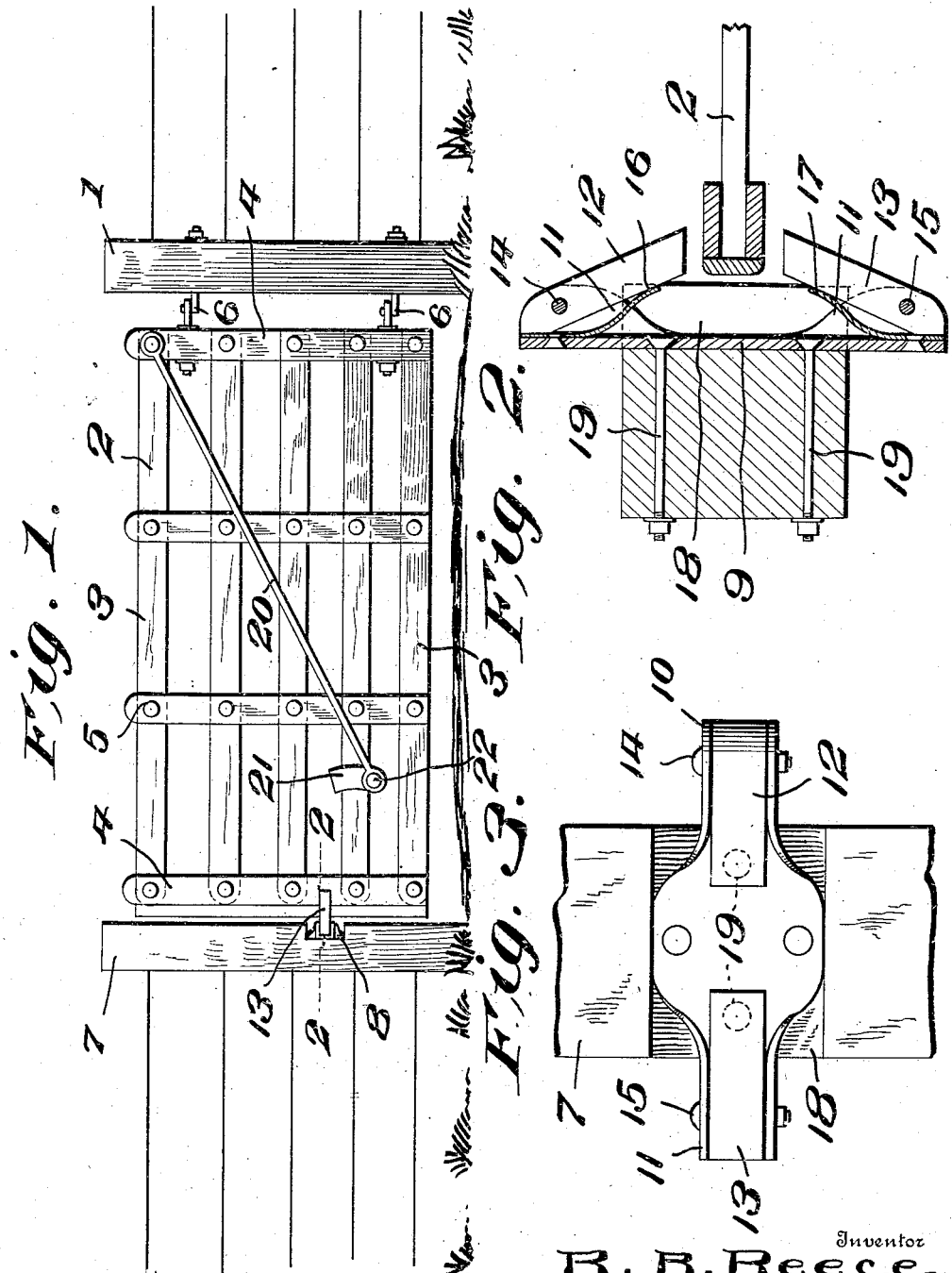

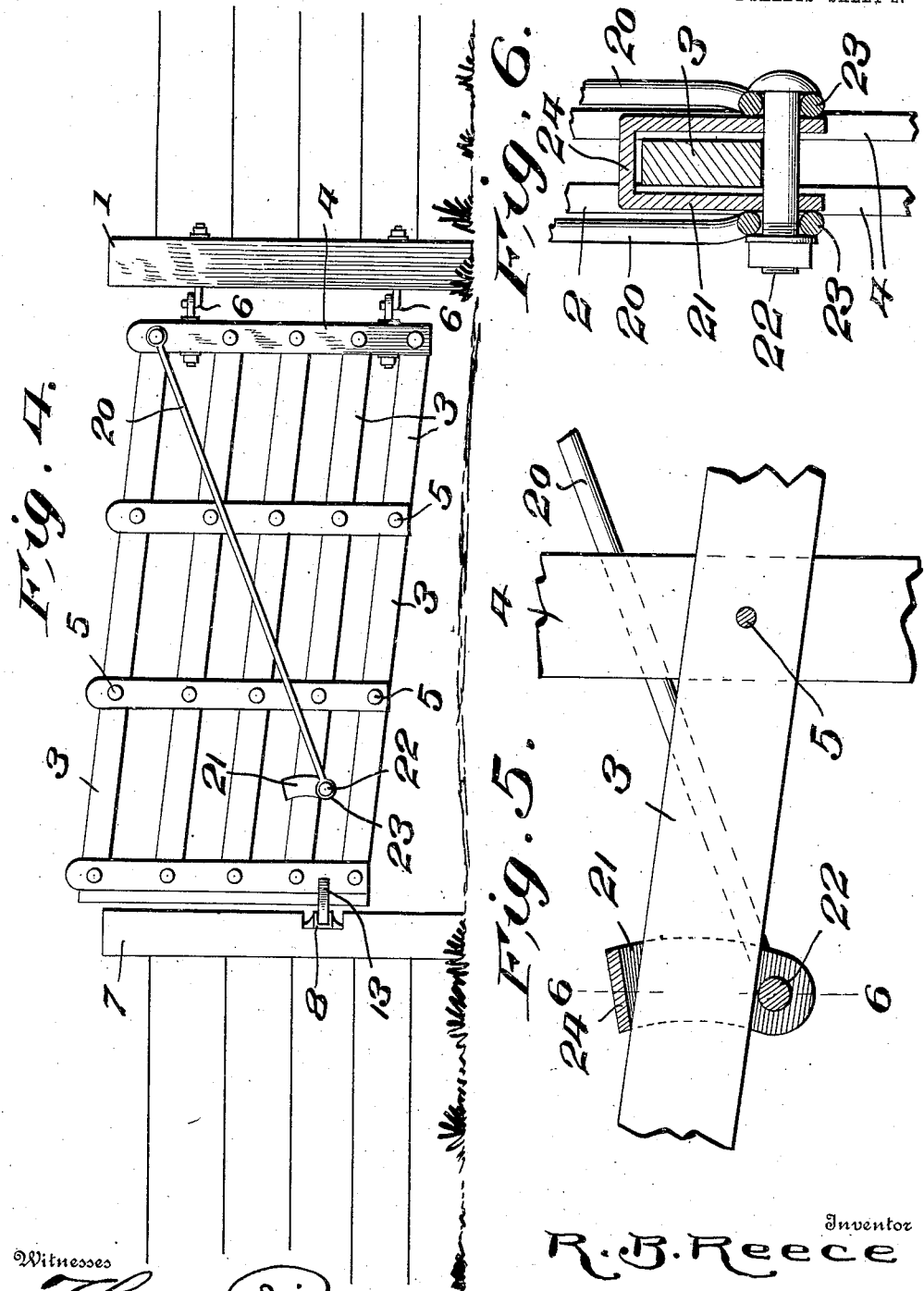

UNITED STATES PATENT OFFICE.

RANKIN BERT REECE, OF KNIGHTSTOWN, INDIANA.

GATE.

No. 874,541.  Specification of Letters Patent.  Patented Dec. 24, 1907.

Application filed June 10, 1907. Serial No. 378,247.

*To all whom it may concern:*

Be it known that I, RANKIN BERT REECE, a citizen of the United States, residing at Knightstown, in the county of Henry and State of Indiana, have invented certain new and useful Improvements in Gates; and I do hereby declare the following to be a full, clear, and exact description of the invention, such as will enable others skilled in the art to which it appertains to make and use the same.

My invention relates to new and useful improvements in gates and more particularly to that class known as farm gates, and my object is to provide means to adjust the gate vertically so as to elevate the same above the ground.

A further object is to provide means for holding the gate in its adjusted position and a still further object is to provide a latch for the gate whereby the same will be held in its closed position.

Other objects and advantages will be hereinafter referred to and more particularly pointed out in the claims.

In the accompanying drawings which are made a part of this application, Figure 1 is a side elevation of my improved gate, showing the same in position in a line of fence. Fig. 2 is a detail sectional view on an enlarged scale, as seen on line 2—2, Fig. 1. Fig. 3 is a front elevation of the latch employed in securing the gate in its closed position. Fig. 4 is a side elevation showing the gate in its elevated position. Fig. 5 is a detail sectional view on an enlarged scale showing the means for holding the gate in its raised position, and, Fig. 6 is a detail sectional view as seen on line 6—6, Fig. 5.

Referring to the drawings in which similar reference numerals designate corresponding parts throughout the several views, 1 indicates the usual anchor post, such as is used in connection with fence construction, to which is hingedly mounted my improved gate 2, said gate comprising a plurality of horizontally disposed bars 3 and a plurality of vertically disposed standards 4, said standards being arranged in pairs, one at each side of the bars and spaced a suitable distance apart throughout the length of the bars and are held into engagement with the bars by passing bolts, or the like, 5 through the standards and bars. The gate is swung to the anchor post 1 by means of hinges 6, one section of which is secured to the post 1, while the opposite section thereof is secured to one end of the gate.

At the free end of the gate 2, I provide the usual latch post 7, to which is secured my improved form of latch 8, which consists of a plate 9, having at each end thereof, a pair of ears 10 and 11 respectively, between which are pivotally mounted keepers 12 and 13 respectively, said keepers being held in position between the ears by means of pivot pins 14 and 15 respectively. The keepers extend towards each other and are inclined outwardly from the face of the plate 9 and their meeting ends are spaced apart to receive the free end of the gate. The outward, swinging movement of the keepers 12 and 13 is limited by extending the pivoted ends of the keepers slightly beyond their pivotal points, so that the extended portion thereof will engage the face of the plate when the keepers are swung outwardly and the keepers are normally held in their outward position by means of springs 16 and 17, which are secured to opposite ends of the plate 9 and have their free ends curved and extended into engagement with the inner faces of the keepers 12 and 13 respectively. That face of the post 7, adjacent the end of the gate, is provided with a recess 18, in which the plate 9 is seated and the plate is held in engagement with the post by means of anchoring bolts 19, which extend through the plate and post. By providing this form of latch, it will be seen that when the gate is standing open and is given a swinging movement, the free end of the gate will engage the outer surface of one of the keepers and depress the same, so that the gate will freeely pass therebeyond, but the swinging movement of the gate will be checked, by encountering the projected end of the opposite keeper, and by providing a sufficient space between the ends of the keepers, the end of the gate will be free of the depressed keeper before engaging the opposite keeper, and as soon as the gate has passed clear of the depressed keeper, the spring will immediately return the keeper to its outward position.

In some instances, it is desirable to elevate the gate so that the same will freely pass over obstacles, such as snow, or the like. To accomplish this result, I secure to the upper end of the standards adjacent the hinged end of the gate, a pair of rods 20, said rods extending downwardly and forwardly, to a point adjacent the free end of the gate, where they are pivotally secured to the lower end of a stirrup 21, said stirrup being directed over one of the bars 3, with the open end thereof extending downwardly, a bolt 22 being extended through openings in the lower end of the stirrup and through eyes 23 on the lower ends of the rods 20. The stirrup is curved, so that when said stirrup rests in a vertical position, the closed end 24 thereof will be at an angle to the upper edge of the bar, to which the stirrup is secured, so that one end only of the closed end 24 will engage the edge of the bar, and as the bolt 22 extends below the lower edge of the bar, the stirrup is clamped on the bar when weight is directed against the rods 20, and it will be seen that when the free end of the gate is elevated, as shown in Figs. 4 and 5 of the drawings and the closed end of the stirrup moved forwardly until one end thereof is in engagement with the upper edge of the bar, said gate will be held in its elevated position, thereby allowing the gate to swing over obstacles upon the ground.

This gate may also be employed for separating smaller animals from the larger ones, as the smaller animals may freely pass below the gate when in its elevated position and by properly adjusting the stirrup, the gate may be held at various heights.

It will be seen that when the gate is in its elevated position, the greater the weight at the free end of the gate, the more securely the stirrup will be clamped upon the engaged bar, and it will further be seen that the rods 20 will serve as braces for the gate.

What I claim is:

In a gate of the class described, the combination with a gate, consisting of a plurality of horizontally disposed bars, vertically disposed standards at each side of said bars and means to pivotally secure the bars and standards together; of means to hold said bars in various positions above the horizontal, comprising a pair of rods, a stirrup extending over one of said bars, a bolt extending through eyes on said rods and through the lower end of the stirrup, whereby when weight is directed on said rods, the stirrup will be clamped in engagement with said bar and means to secure the upper ends of said rods to parts of the gate.

In testimony whereof I have signed my name to this specification in the presence of two subscribing witnesses.

RANKIN BERT REECE.

Witnesses:
 ARTHUR PAER,
 ELBERT HODSON.